United States Patent
Kartalov et al.

(10) Patent No.: US 8,424,560 B2
(45) Date of Patent: Apr. 23, 2013

(54) MULTI-VALVE MICROFLUIDIC DEVICES AND METHODS

(75) Inventors: Emil P. Kartalov, Pasadena, CA (US); John Liu, Gilbert, AZ (US); Axel Scherer, Laguna Beach, CA (US); Clive Taylor, Malibu, CA (US)

(73) Assignees: University of Southern California, Los Angeles, CA (US); California Institute of Technology, Pasadena, CA (US)

( * ) Notice: Subject to any disclaimer, the term of this patent is extended or adjusted under 35 U.S.C. 154(b) by 300 days.

(21) Appl. No.: 12/636,086

(22) Filed: Dec. 11, 2009

(65) Prior Publication Data

US 2010/0186840 A1 Jul. 29, 2010

Related U.S. Application Data

(60) Provisional application No. 61/201,889, filed on Dec. 16, 2008.

(51) Int. Cl.
| | |
|---|---|
| *F16K 31/365* | (2006.01) |
| *F16K 31/36* | (2006.01) |
| *F15C 3/04* | (2006.01) |
| *F15C 1/06* | (2006.01) |

(52) U.S. Cl.
USPC .......... 137/505.12; 137/505.13; 137/829; 137/833

(58) Field of Classification Search ......... 137/505.13, 137/825, 833, 829, 87.04, 87.03, 484.4, 497, 137/498, 500, 505.12
See application file for complete search history.

(56) References Cited

U.S. PATENT DOCUMENTS

| | | | | |
|---|---|---|---|---|
| 1,196,121 | A | * | 8/1916 | Larsen ................... 417/17 |
| 1,850,133 | A | * | 3/1932 | Munzinger ............. 137/497 |
| 2,270,304 | A | * | 1/1942 | Jacobsson ............ 137/118.06 |
| 2,635,392 | A | * | 4/1953 | Jean ................... 137/505.47 |
| 3,053,272 | A | * | 9/1962 | Babson ................ 137/505.13 |
| 3,428,406 | A | * | 2/1969 | Nutten et al. ............ 431/12 |
| 4,381,816 | A | * | 5/1983 | Granetzke et al. ....... 165/286 |
| 4,924,905 | A | | 5/1990 | Mastromatteo |
| 5,456,281 | A | * | 10/1995 | Teay ................... 137/505.12 |
| 5,740,833 | A | * | 4/1998 | Olds et al. ............. 137/505.12 |
| 6,056,277 | A | * | 5/2000 | Wode .................. 267/64.11 |
| 6,623,860 | B2 | * | 9/2003 | Hu et al. ............... 428/411.1 |
| 2002/0029814 | A1 | | 3/2002 | Unger et al. |
| 2007/0119510 | A1 | | 5/2007 | Kartalov et al. |

OTHER PUBLICATIONS

Adams, M.L. et al., "Polydimethylsiloxne Based microfluidic diode" Journal of Micromecahics and Microengineering, 15, pp. 1517-1521, 2005.

Anderson, J. R. et al., "Fabrication of Topologically Complex Three-Dimensional Microfluidic Systems in PDMS by rapid prototyping", Analytical Chemistry, vol. 72., No. 14 pp. 3158-3164, Jul. 15, 2000.

Balagadde, F. K. et al., "Long-Term monitoring of bacteria undergoing programmed population control in a microchemostat", Science, vol. 309, 137-140. Jul. 1, 2005.

(Continued)

*Primary Examiner* — Craig Schneider
*Assistant Examiner* — Jonathan Waddy
(74) *Attorney, Agent, or Firm* — Steinfl & Bruno LLP

(57) ABSTRACT

Multi-valve autoregulatory microfluidic devices and methods are described. The described devices and methods offer improved performance and new means of tuning autoregulatory effects in microfluidic devices.

17 Claims, 4 Drawing Sheets

OTHER PUBLICATIONS

Duffy, D.C. et al., "Rapid Prototyping of Microfluidic system in Poly(dimethylsiloxane)" Analytical Chemistry, vol. 70, No. 23, pp. 4974-4984, Dec. 1, 1998.

Feynman R., "Infinitesimal Machinery" Journal of Microelectromechanical system, vol. 2, No. 1, pp. 4-14, 1993.

Faynman, R., "There's plenty of room at the bottom", Journal of Microelectromechanical Systems, vol. 1, No. 1, Mar. 1992.

Fu A.Y. et al., "An integrated microfabricated cell sorter", Analytical Chemistry, vol. 74, No. 11, 2451-2457, 2002.

Gomez-Sjoberg, R., et al., "Versatile, fully automated, microfluidic cell culture system", Analitical Chemistry, vol. 79, No. 22, 8557-8563, 2007.

Groisman, A et al., "A microfluidic rectifier: anisotropic flow resistance at low Reynolds numbers", Physical review letters, vol. 92, No. 9, 2004.

Groisman, A et al., "Microfluidic memory and control devices" Science, vol. 300, May 9, 2003.

Gunn, J. B., "Microwave oscillations of current in III-V semiconductors", Solid States Communication, vol. 1, pp. 88-91, 1963.

Hansen, C.L. et al., "A robust and scalable microfluidic metering method that allows protein crystal growth by free interface diffusion", PNAS, vol. 99, No. 26, pp. 16531-16536, Dec. 24, 2002.

Hasselbrink, E.F. et al., "High-pressure microfluidic control in lab-on-a-chip-devices using mobile polymer-monoliths", Analytical Chemistry, vol. 74, No. 19, pp. 4913-4918, Oct. 1, 2002.

Hong, J. W. et al., "A nanoliter-scale nucleic acid processor with parallel architecture", Nature Biotechnology, vol. 22, No. 4, pp. 435-439, Apr. 2004.

Hosokawa, K. et al., "A pneumatically-actuated three-way microvalve fabricated with polydimethylsiloxane using the membrane transfer technique", J. Micromech. Microeng., 10, pp. 415-420, 2000.

Ionescu-Zanetti, C. et al., "Mammalian electrophysiology on a microfluidic platform", PNAS, vol. 102, No. 26, pp. 9112-9117, Jun. 28, 2005.

Jiang, X. et al., "A miniaturized, parallel, serially diluted immunoassay for analyzing multiple antigens", J.Am. Chem. Soc., 125, pp. 5294-5295, 2003.

Kartalov, E.P. et al., "Electrical microfluidic pressure gauge for elastomer microelectromechanical system", Journal of applied Physics, 102, 2007.

Kartalov, E.P. et al., "Experimentally validated quantitative linear model for the device physics of elastomeric, microfluidic valves", Journal of applied Physics, 101, 2007.

Kartalov, E.P. et al., "High-throughput multi-antigen microfluidic fluorescence immunoassays", BioTechniques, 85, col. 40, No. 1, 2006.

Kartalov, E.P. et al., "Microfluidic device reads up to four consecutive base pairs in DNA sequencing-by-synthesis", Nucleic acids research, vol. 32, No. 9 pp. 2873-2879, 2004.

Kartalov, E.P. et al., "Microfluidic vias enable nested bioatrrays and autoregulatory devices in Newtonian fluids", PNAS, vol. 103, No. 33, pp. 12280-12284, Aug. 15, 2006.

Lee, C.C. et al., "Multistep synthesis of a radiolabeled imaging probe using integrated microfluidics", Science, vol. 310, Dec. 16, 2005.

Liu, J. et al., "A nanoliter rotarydevice for polymerase chain reaction", Electrophoresis, 23, pp. 1531-1536, 2002.

Liu, J. et al., Solving the "world-to-chip" Analytical Chemistry, vol. 75, No. 18, Sep. 15, 2003.

Merkel, T.C. et al., "Gas sorption, diffusion, and permeation in poly(dimethylsiloxane)", Journal of Polymer Science: Part B: Polymer Physics, vol. 38, pp. 415-434, 2000.

Ng, J.M.K. et al., "Components for integrated poly(dimethylsiloxane) microfluidic system", Electrophoresis, 23, pp. 3461-3473, 2002.

Prakash, M. et al., "Microfluidic bubble logic" Science, vol. 315, pp. 832-835, Feb. 9, 2007.

Scott Ohillips, K. et al., "Microfluidic immunoassay for bacterial toxins with supported phospholipid bilayer membranes on poly(dimethylsiloxane)", Analytical Chemistry, vol. 77, No. 1 pp. 327-334, Jan. 1, 2005.

Seidemann, V. et al., "Fabrication and investigation of in-plane compliant SU8 structures for MEMS and their application to micro valves and micro grippers" Sensors and Actuators A 197-198, pp. 457-461, 2002.

Seidmann, V. et al., "SU8-micromechanical structures with in situ fabricated movable parts", Microsystem Technologies, 8, pp. 348-350, 2002.

Shaikh, K.A. et al., "A modular microfluidic architecture for integrated biochemical analysis", PNAS, vol. 102, No. 28, pp. 9745-9750, Jul. 12, 2005.

Sim, W. Y. et al., "A phase-change type micropump with aluminum flap valves", Journal of Micromechanics and Microengineering, 13, pp. 286-294, 2003.

Sohn, L.L. et al., "Capacitance cytometry: measuring biological cells one by one", PNAS, vol. 97, No. 20, pp. 10687-10690, Sep. 26, 2000.

Studer, V. et al., "Scaling properties of a low-actuation pressure microfluidic valve", Journal of applied Physics, vol. 95, No. 1, pp. 393-398, Jan. 1, 2004.

Taylor, A.M. et al., "A microfluidic culture platform for CNS axonal injury, regeneration and transport", Nature methods, vol. 2, No. 8, pp. 599-605, Aug. 2005.

Thorsen, T. et al., "Microfluidic Large-scale integration", Science, vol. 298, pp. 580-584, Oct. 18, 2002.

Unger, M.A. et al., "Monolithic microfabricated valves and pumps by multilayer soft lithography", Science, vol. 288, pp. 113-116, Apr. 7, 2000.

Vestad, T. et al., "Flow resistance for microfluidic logic operations", Appllied Physics Letters, vol. 84, No. 25, Jun. 21, 2004.

Watts, P. et al., "Microfluidic combinatorial chemistry", Current Opinion in Chemical Biology, 7, pp. 370-387, 2003.

Wu, H. et al., "Chemical cytometry on a picoloter-scale-integrated microfluidic chip", PNAS, vol. 101, No. 35, pp. 12809-12813, Aug. 31, 2004.

Restriction Requirement issued for U.S. Appl. No. 11/606,312 on Oct. 26, 2009.

Office Action issued for U.S. Appl. No. 11/606,312 on Jan. 29, 2010.

* cited by examiner

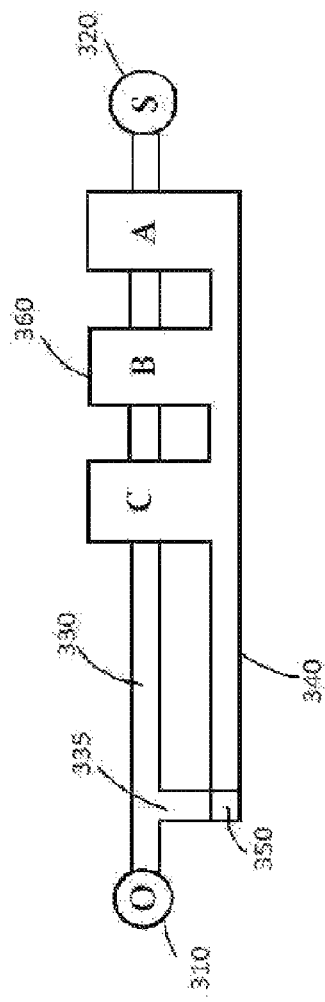
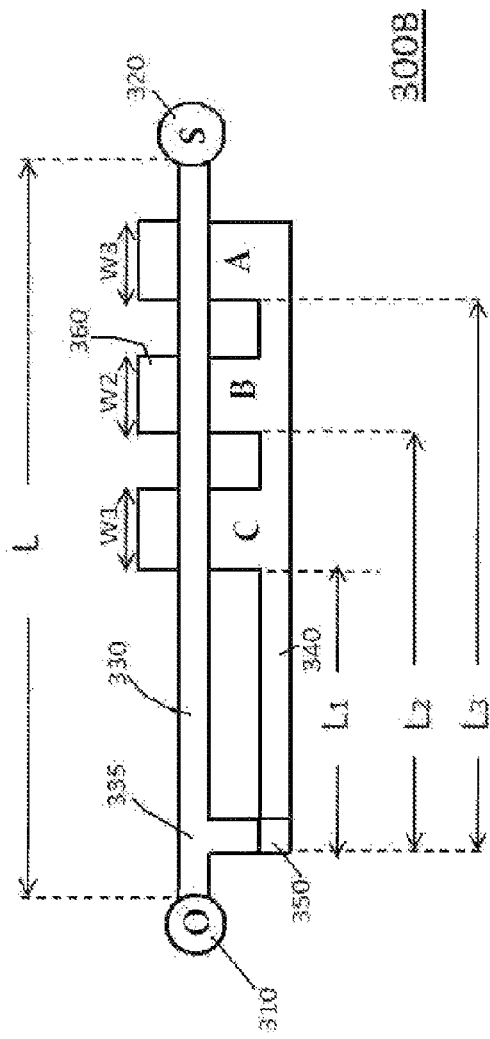

MULTI-VALVE MICROFLUIDIC DEVICES AND METHODS

CROSS REFERENCE TO RELATED APPLICATIONS

The present application claims priority to U.S. Prov. App. No. 61/201,889 filed on Dec. 16, 2008, which is incorporated herein by reference in its entirety. The present application is also related to US Pat. App. No. 2007/0119510 which is incorporated herein by reference in its entirety.

STATEMENT OF GOVERNMENT GRANT

The U.S. Government has certain rights in this invention pursuant to Grant No. W911NF-07-1-0277 awarded by ARO—US Army Robert Morris Acquisition Center, Grant No. HR0011-04-1-0032 awarded by DARPA and Grant No(s). HG002644 and 1K99007151 awarded by National Institutes of Health.

FIELD

The present disclosure relates to microfluidic devices. In particular, it relates to multi-valve microfluidic devices and methods.

BACKGROUND

Microfluidic autoregulator devices are shown in US Pat. App. No. 2007/0119510 A1 as mentioned above. For the sake of clarity and ease of read, some aspects of that disclosure are summarized in this section.

FIG. 1 shows a top view of a current source (100). Fluid flows from an origin (110) to a sink (120) along a flow channel (130). The current source (100) is referenced as a "detour" current source in view of a dead-end detour (145) provided from a detour split (135) into a detour channel (140) and through a via (150) ending at a valve (160). It is noted from FIG. 1 that the valve (160) is located in a different plane than the rest of the current source (100), i.e. then the remaining part of the current source (100) which includes sections indicated by reference numbers (110), (120), (130), (135), (140). A connection between the valve (160) and the rest of the current source (100) is made through the via (150). The valve (160) has a function of controlling the throughput of the current source (100).

When viscous laminar flow is established into the flow channel (130), e.g. by applying pressure at the origin (110) and allowing the fluid to leave at the sink (120), Poiseuille's law establishes that static pressure will decrease from the origin (110) to the sink (120) down the flow channel (130). Simultaneously, there is no flow in the dead-end detour channel (140), so a static pressure there is constant and the same as the one at the detour split (135). As a result, a pressure difference is generated across the valve (160) and therefore the valve (160) constricts the flow channel (130). Thus an overall fluidic resistance of the flow channel (130) increases with applied pressure between the origin (110) and the sink (120). The result is a non-linear device.

FIG. 2 shows a current source (200) in a "loop" configuration. Differently from the embodiment of FIG. 1, the current source (200) is not using a detour. The flow channel (230) passes through a valve (260), forming a loop (235) to the sink (220) through a via (250) and a channel (240). It is noted from FIG. 2 that the channel (240) and the sink (220) are located in a separate plane from that of the rest of the current source (200), i.e from that of the remaining part of the current source (200) which includes sections indicated by reference numbers (210), (230), (260).

In a similar way as described above in reference to FIG. 1, when fluid flows into the current source (200) by applying a pressure at an origin (210), a pressure difference across the valve (260) based on the Poiseuille's law results in a channel constriction. Hence, overall device resistance to flow from the origin (210) to the sink (220) increases as applied pressure increases resulting in a non-linear behavior of the current source (200).

Referring to the representation of FIG. 1, the current source (100) comprises a multi-layer chip (not shown in this view) and can be constructed in two different configurations, "pushdown" (in which the valve (160) is fabricated above the main channel (130) and a valve membrane (not shown in this view) deflects downward to constrict the main channel (130)), or "pushup" (in which the valve (160) is fabricated below the main channel (130) and the valve membrane deflects upward to constrict the main channel (130)). In the same way, referring to FIG. 2, a relative position of valve (260) and main channel (240) determines and allows for "pushdown" and "pushup" configurations to be executed with the loop current source (200). Therefore, four types of autoregulatory architectures are possible: pushdown detour, pushup detour, pushdown loop, and pushup loop.

Further referring to FIG. 1, by varying various dimensions the current source (100), throughput can be controlled. As an example, by changing a detour ratio $L_1/L$, the current source (100) throughput saturation level can be modified. As another example, varying the valve width W results in different throughput saturation levels. The larger the valve width W, the lower the throughput saturation level, while lowering saturation is important in building autoregulators of superior performance and quality. However, increasing the valve (160) width while maintaining the same thickness of membrane results in a flabby structure which may cause manufacturing issues. As an example, a flabby membrane can sag downward by gravity and get stuck in a lower channel during fabrication. This defect is usually irreversible in view of the material curing during a manufacturing process. Such effects pose challenges in manufacturing current sources with lower saturation points.

SUMMARY

A solution to the problem illustrated in the background section is to construct architectures with a series of valves connected to a same detour channel and acting on a same flow channel. Such architectures lower the saturation point of a current source as they result in larger increases of resistance for the same increase in pressure. This solution is further described in the following sections of the present disclosure. Additionally, the presented architectures can be used as a novel tool to tune autoregulatory properties of current sources and their derivative compound devices.

According to a first aspect, a method of controlling a microfluidic device throughput is provided, comprising: providing an origin of a fluid; providing a sink of the fluid; providing a flow channel containing the fluid; the flow channel coupling the origin and the sink; applying a pressure difference between the origin and the sink; and constricting the flow channel at a plurality of points on the flow channel by applying forces to the plurality of the points on the flow channel, wherein the forces are dependent on a throughput of the fluid.

According to a second aspect, a multi-valve current source is provided, comprising: an origin of a fluid; a sink for the fluid; a flow channel coupling the origin and the sink; a plurality of valves communicated to the flow channel to selectively control flow of the fluid therethrough; and means dependent on flow through the flow channel for creating pressure differentials across the plurality of valves to at least partially activate the plurality of valves to control flow of fluid through the flow channel.

Further aspects of the present disclosure are shown in the descriptions, drawings and claims of the present application.

BRIEF DESCRIPTION OF FIGURES

FIGS. 3A-B shows top views of detour multi-valve current sources.

DETAILED DESCRIPTION

Figure 1:
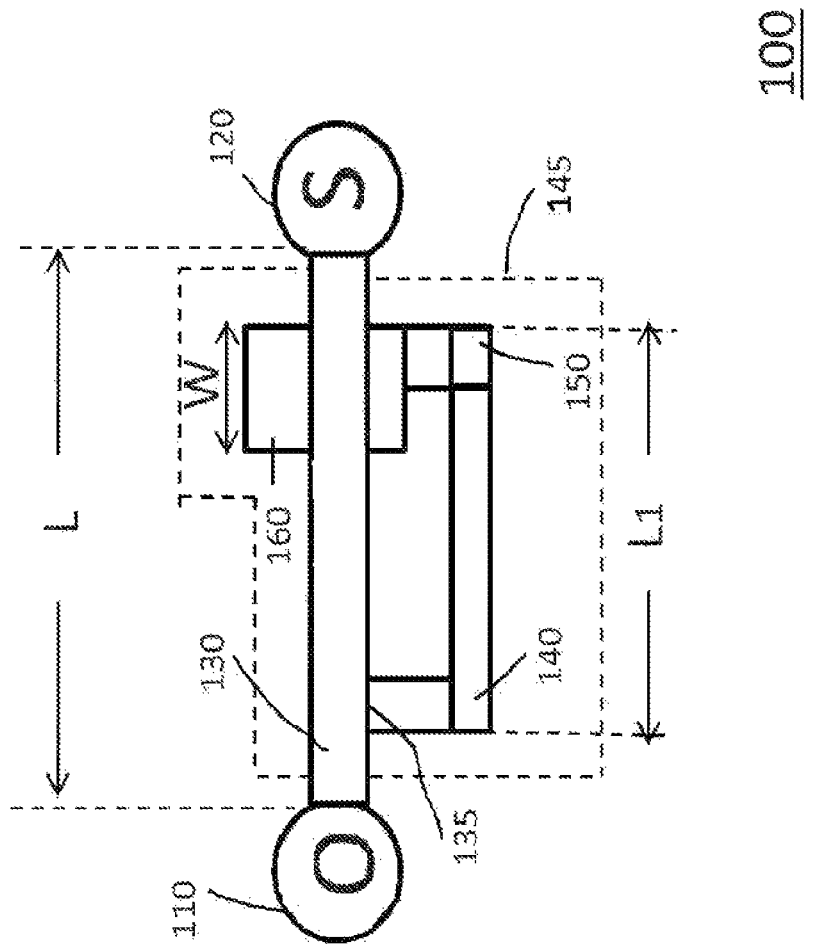
FIG. 1 shows a top view of a prior art "detour" microfluidic current source.

Herein, multi-valve microfluidic devices and methods are described.

FIGS. 3A-B show top views of detour multi-valve current sources (300A, 300B) in respective pushdown and pushup configurations, in accordance with embodiments of the present disclosure. Throughout the present application, a current source is defined as a microfluidic device wherein the fluid throughput is substantially constant over a range of applied pressures. In FIG. 3A sections indicated by references numbers (310), (330), (335), (320) and reference letters (O), (S) are located in a lower layer (not shown in this view) and sections indicated by references numbers (340), (360) are located in an upper layer (not shown in this view). In FIG. 3B sections indicated by references numbers (340), (360) are located in a lower layer (not shown in this view) and sections indicated by references numbers (310), (335), (330), (320) and reference letters (O), (S) are located in an upper layer (not shown in this view). The sections in the lower layer are coupled with the ones in the upper layer through vias (350). Referring to FIG. 3A, according to an embodiment of the disclosure, the detour multi-valve current sources (300A, 300B) each have three valves (360) denoted by letters A, B, and C. Moreover, each of the detour multi-valve current sources (300A, 300B) comprises an origin (310), a sink (320), a flow channel (330) and a detour channel (340) split from the flow channel (330) at a detour split (335).

Referring to FIGS. 3A-B, fluid flows from the origin (310) to the sink (320) by applying pressure to the origin (310). In a detour configuration, the static pressure inside the detour channel (340) is constant and the same as the one at the detour split (335). In other words, a side of the valve (360) connected to the detour channel (340) experiences the same static pressure as the detour split (335). At the same time, the pressures in the flow channel (330) on an other side of valves (360) A, B, and C are lower than the static pressure at the detour split (335) according to Poiseuille's law. As such, the valves (360) experience a pressure difference and therefore, constrict the flow channel (330). As each valve (360) has an independent contribution to an overall channel resistance, individual valve resistances add up. As a consequence, a larger increase in resistance as a function of applied pressure is achieved compared to a scenario wherein only one valve is used. In other words, at the same applied pressure, a multi-valve device offers a larger resistance than a single-valve device does, resulting in an accordingly lowered saturation throughput.

Further referring to FIGS. 3A-B, the person skilled in the art will understand that further embodiments utilizing any number of valves (360) can be envisaged. The person skilled in the art will also appreciate that a new level of throughput control is achieved by changing the number of valves (360), in contrast with the ones described in reference to the embodiment of FIG. 1. Referring to FIGS. 3A-B, according to an embodiment of the disclosure, varying a detour ratio $L_1/L$ can control a throughput of the detour multi-valve current sources (300A, 300B). According to further embodiments of the present disclosure, varying individual valve widths W1, W2 and W3 is also used to tune the throughput of the detour multi-valve current sources (300A, 300B). Additionally, since a detour length is measured from the common detour split (335) to the location of a respective valve down the main channel, multi-valve devices technically have their valves situated at different detour lengths, e.g. $L_1, L_2, L_3$ as shown in FIGS. 3A-B. A combination of the detour lengths $L_1, L_2$, and $L_3$ with the flow channel (330) length L establishes different detour ratios ($L_1/L, L_2/L, L_3/L$) and thus different saturation characteristics. Since these lengths are independently tunable, an increased flexibility in engineering operational parameters of autoregulatory devices can be achieved. In yet another embodiment of the present disclosure, the valves (360) are asymmetric having membranes with non-uniform width and/or thickness. Such embodiment provides an additional level of control on autoregulatory behavior of the multi-valve current sources (300A, 300B).

Figure 2:
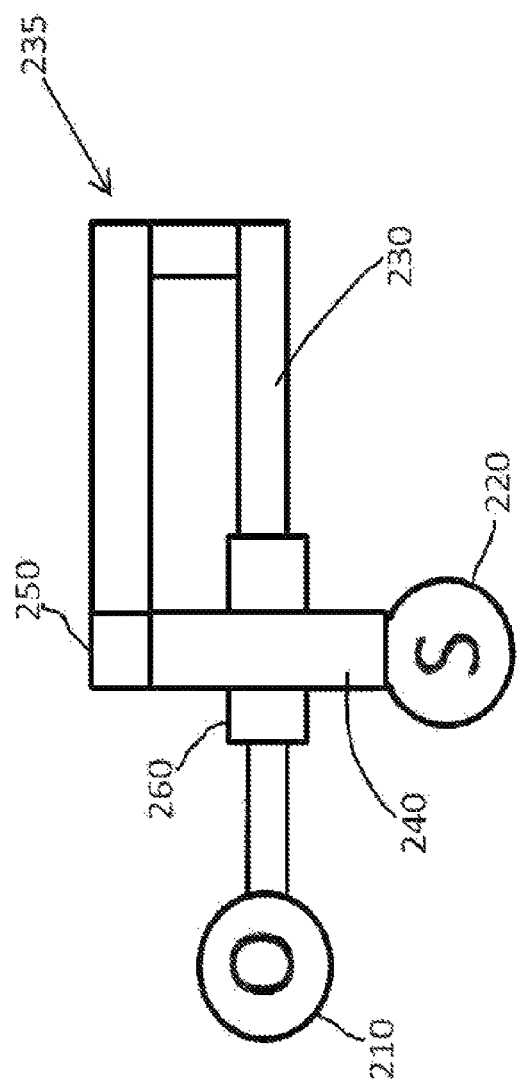
FIG. 2 shows a top view of a prior art "loop" microfluidic current source.
Figure 4A:
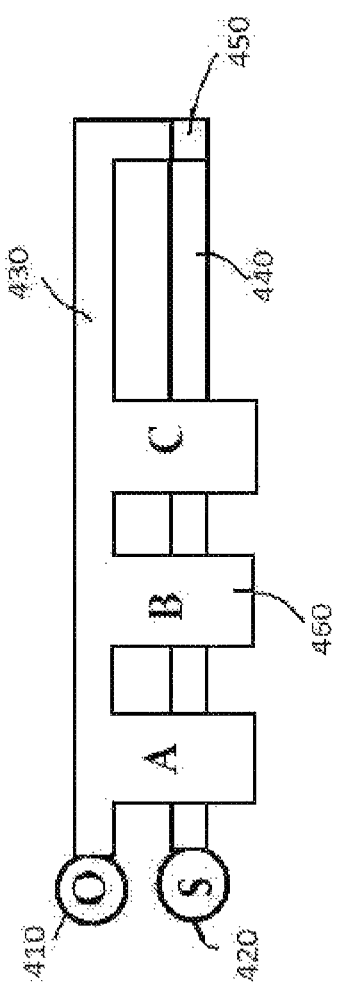
FIGS. 4A-B shows top views of loop multi-valve current sources.
Figure 4B:
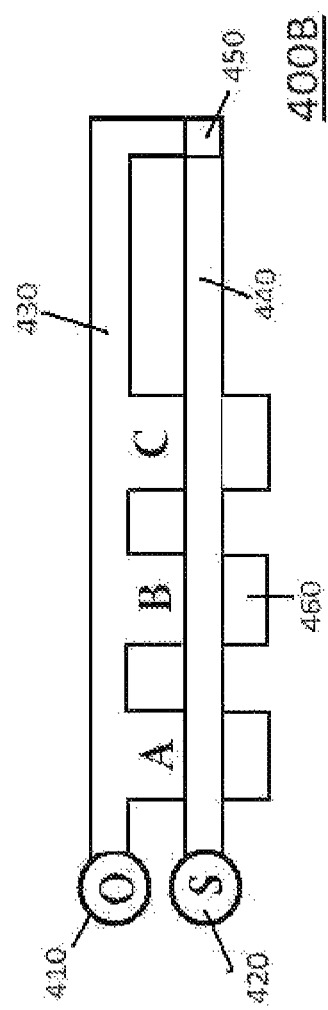

FIGS. 4A-B show top views of loop multi-valve current sources (400A, 400B) in respective pushdown and pushup configurations, in accordance with further embodiments of the present disclosure. In FIG. 4A sections indicated by references numbers (420), (440) and reference letter (S) are located in a lower layer and sections indicated by references numbers (410), (430), (460) and reference letter (O) are located in an upper layer. The sections in the lower layer are coupled with the ones in the upper layer through vias (450). In FIG. 4B sections indicated by references numbers (410), (430), (460) and reference letter (O) are located in a lower layer (not shown in this view) and sections indicated by references numbers (420), (440) and reference letter (S) are located in an upper layer (not shown in this view). The embodiments shown in FIGS. 4A-B, function according to the same principle as described above in reference to the embodiment of FIGS. 2-3. Three valves (460) A, B, and C are shown in FIGS. 4A-B. According to embodiments of the present disclosure, in the same way as described regarding the embodiments of FIGS. 3A-B, by varying individual widths W1, W2 and W3 of the valves (460), the loop multi-valve current source (400) throughput is controlled. Finally, the multi-valve loop current source (400A, 400B) in FIGS. 4A-B can be tuned by varying a location of the valves (460) along the flow channel (430). For example, moving a valve closer to an origin (410) will increase the pressure difference at the valve as a percentage of the total applied pressure (in analogy with an electrical potentiometer), leading to saturation at lower total applied pressure.

The embodiments presented with reference to FIGS. 3A-B and FIGS. 4A-B are exemplary embodiments described in the context of a multi-layer fabrication approach. The person skilled in the art will understand that the described multi-valve architectures can also be built using other fabrication methods, such as single-layer fabrication. Furthermore, the multi-valve methods and concepts as described in the present disclosure are immediately applicable to microfluidic channels acting upon themselves to produce regulatory features and fabricated using any manufacturing approach.

The present disclosure has shown microfluidic control devices and related methods. While the microfluidic control devices and related methods have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

The invention claimed is:

1. A multi-valve current source comprising:
an origin of a fluid;
a sink for the fluid;
a flow channel coupling the origin and the sink;
a plurality of valves that communicate with the flow channel to selectively constrict flow of the fluid therethrough in a plurality of points; and
pressure differential means dependent on flow through the flow channel for creating pressure differentials across the plurality of valves to at least partially activate the plurality of valves to constrict flow of fluid through the flow channel, wherein said pressure differential means is connected, on one side, to each valve of the plurality of valves and, on the other side, to the flow channel at a junction region between the origin of the fluid and the plurality of valves.

2. The multi-valve current source of claim 1, further comprising a multilayer chip and wherein the plurality of valves are provided in one layer of the chip and the flow channel is defined in an adjacent layer of the chip.

3. The multi-valve current source of claim 1, wherein the plurality of valves comprise membranes with non-uniform widths and/or thicknesses.

4. The multi-valve current source of claim 1, wherein the pressure differential means is connected in parallel to each valve of the plurality of valves.

5. The multi-valve current source of claim 1, wherein the plurality of valves are serially arranged relative to the flow channel and connected in parallel to the pressure differential means.

6. The multi-valve current source of claim 1, wherein the plurality of valves are serially arranged relative to the flow channel and each one of the plurality of valves is arranged in a cross-configuration relative to the flow channel, the pressure differential means being connected to each of the plurality of the valves on the same side of flow channel.

7. The multi-valve current source of claim 1, wherein the plurality of valves experience a fluid pressure difference in order to constrict the flow channel.

8. The multi-valve current source of claim 1, wherein each valve of the plurality of valves provides an independent contribution to an overall fluid resistance of the flow channel.

9. The multi-valve current source of claim 1, wherein the pressure differential means comprises a detour channel connecting the flow channel to each valve of the plurality of valves.

10. The multi-valve current source of claim 9, further comprising a multilayer chip and a single via between two adjacent layers, and wherein the plurality of valves are provided in one layer of the chip and the flow channel is defined in an adjacent layer of the chip, the detour channel being connected to the plurality of valves through the single via.

11. The multi-valve current source of claim 9, further comprising a multilayer chip and a single via between two adjacent layers, and wherein the plurality of valves are provided in one layer of the chip and the flow channel is defined in an adjacent layer of the chip, the detour channel being defined in the same layer of the plurality of valves and communicated to the flow channel through the single via.

12. The multi-valve current source of claim 9, wherein a saturation throughput of the multi-valve current source is a function of ratio $L_1/L$ and ratio $L_2/L$, wherein L is a length of the flow channel between the origin and the sink, $L_1$ is a length of the detour channel between the junction region and a first valve of the plurality of valves, and $L_2$ is a length of the detour channel between the junction region and a second valve of the plurality of valves.

13. The multi-valve current source of claim 9, wherein
the plurality of the valves are situated at different detour lengths,
a detour ratio of a valve is $L_x/L$, L being a length of the flow channel between the origin and the sink, and $L_x$ being a detour length of each valve of the plurality of valves,
a saturation throughput characteristic of the multi-valve current source depends on the detour ratio of the valves, and
a variation of $L_x$ of a valve of the plurality of valves determines a variation of the saturation throughput of the multi-valve current source.

14. A multi-valve current source comprising:
an origin of a fluid;
a sink for the fluid;
a flow channel coupling the origin and the sink;
a detour channel split from the flow channel at a detour split;
the fluid flowing from the origin to the sink;
a plurality of valves;
wherein a first side of each valve is connected to the detour channel and experiences, in operation, a same pressure as the detour split, and a second side of each valve is connected to the flow channel and experiences lower pressure than at the detour split, whereby each valve is configured to experience a fluid pressure on the second side that is lower than a fluid pressure on the first side, and wherein
each valve provides an independent contribution to an overall flow channel resistance, wherein individual valve resistances of the plurality of valves add up.

15. The multi-valve current source of claim 14, wherein the valves constrict the flow channel in a plurality of points.

16. The multi-valve current source of claim 14, wherein a saturation throughput of the multi-valve current source is a function of ratio $L_1/L$ and ratio $L_2/L$, wherein L is a length of the flow channel between the origin and the sink, $L_1$ is a length of the detour channel between the detour split and a first valve of the plurality of valves, and $L_2$ is a length of the detour channel between the detour split and a second valve of the plurality of valves.

17. The multi-valve current source of claim 14, wherein
the plurality of the valves are situated at different detour lengths,
a detour ratio of a valve is $L_x/L$, L being a length of the flow channel between the origin and the sink, and $L_x$ being a detour length of each valve of the plurality of valves,
a saturation throughput characteristic of the multi-valve current source depends on the detour ratio of the valves, and a variation of $L_x$ of a valve of the plurality of valves determines a variation of the saturation throughput of the multi-valve current source.

\* \* \* \* \*